UNITED STATES PATENT OFFICE.

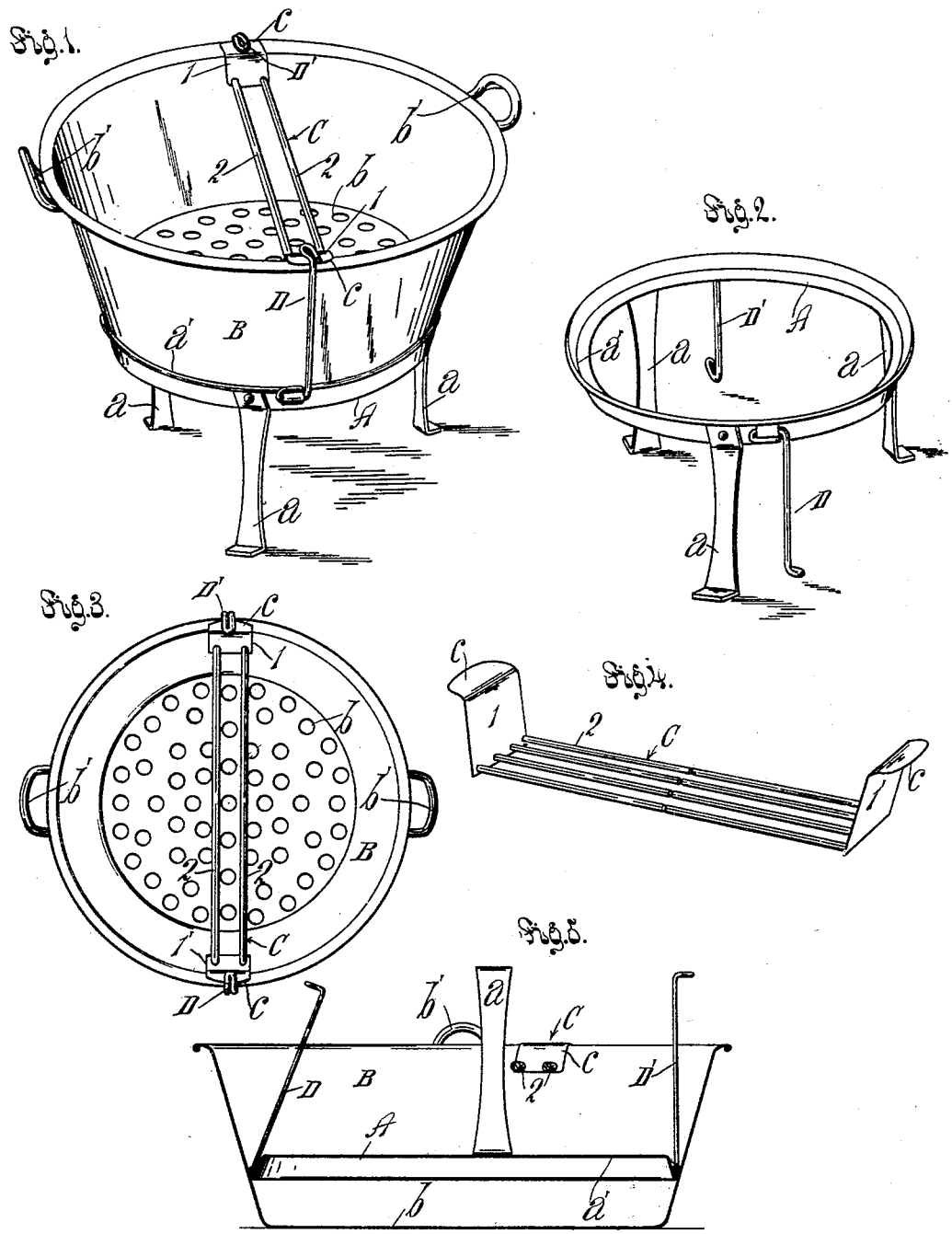

CHRISTINE MARIE HALVORSEN, OF LOS ANGELES, CALIFORNIA.

COMBINED DISH-DRAINER AND COLANDER.

SPECIFICATION forming part of Letters Patent No. 623,366, dated April 18, 1899.

Application filed October 12, 1898. Serial No. 693,346. (No model.)

*To all whom it may concern:*

Be it known that I, CHRISTINE MARIE HALVORSEN, residing at Los Angeles, in the county of Los Angeles and State of California, have invented a new and useful Combined Dish-Drainer and Colander, of which the following is a specification.

The object of this invention is to provide a simple, inexpensive, and convenient utensil which can be used for draining dishes or as a colander.

A further object is to arrange the utensil so that it can be readily stored away in as small space as possible.

The accompanying drawings illustrate my invention.

Figure 1 is a perspective view of my invention set up ready for use. Fig. 2 is a perspective view of the annular stand. Fig. 3 is a plan view of the colander and draining-dish. Fig. 4 is a perspective view of a modification of a draining-rack designed for a larger utensil. Fig. 5 is a sectional view showing the utensil stowed away.

My invention comprises the combination of an annular stand A, having a suitable number of legs $a$, a colander B, with perforated bottom $b$, a rack C, formed of two end pieces 1 1' to fit against the walls of the colander, and rack-bars 2, fastened to the end pieces to be sustained thereby.

$c$ indicates an outwardly-projecting ledge at the top of each of the end pieces to rest upon the top of the walls of the colander. Suitable means are provided for clamping the colander to the stand, and these are preferably hooks, as at D D', which are hinged to the ring of the stand and are adapted to hook over the top of the colander and pass over the ledges to the end pieces to clamp such ledges to the colander and the colander to the stand.

The annular top of the stand is preferably made of a piece of sheet metal pressed to form a seat $a'$, into which the bottom of the colander sits, so that when the clamps are hooked in place all the parts of the utensil are connected and clamped together and are not liable to fall apart, so that the person using the same can lift the entire utensil by the handles $b'$ of the colander.

It is to be understood that my invention may be applied in various different ways without departing from the spirit of my invention.

In practical use the parts will be assembled and clamped together as shown in Fig. 1, and the dishes when washed will be placed in the colander, the plates being placed on edge between the bars of the rack or leaning against the rack, and the cups and saucers and other dishes will be placed on the bottom of the colander or on the rack, as may be desired. The stand will ordinarily be placed in the sink or in a basin provided to catch the water which will drip through the perforated bottom of the colander. The legs $a$ may be of any desired length and the utensil can be of any desired size.

The vessel can be used as a colander with or without the stand, as may be desired.

When it is desired to stow the utensil away, the hooks will be unclamped, the rack removed, the colander taken from the stand, and the stand inverted and placed in the colander and the rack placed thereabove, and the utensil will then be stored away. The colander vessel B is preferably flaring, and the end pieces are set at such an angle to the rack-bars that they fit snugly inside the walls of the vessel.

Now, having described my invention, what I claim as new, and desire to secure by Letters Patent, is—

The combination of the annular stand; the vessel with perforated bottom to fit the stand; a rack with end pieces to rest upon the top of the vessel; and hooks hinged to the stand and arranged to hook over such end pieces.

C. MARIE HALVORSEN.

Witnesses:
JAMES R. TOWNSEND,
ALFRED I. TOWNSEND.